May 5, 1931. H. W. ATWOOD 1,803,456
AUTOMATIC MEANS FOR LUBRICATING THE BEARINGS OF A MACHINE
Filed March 8, 1927   2 Sheets-Sheet 2
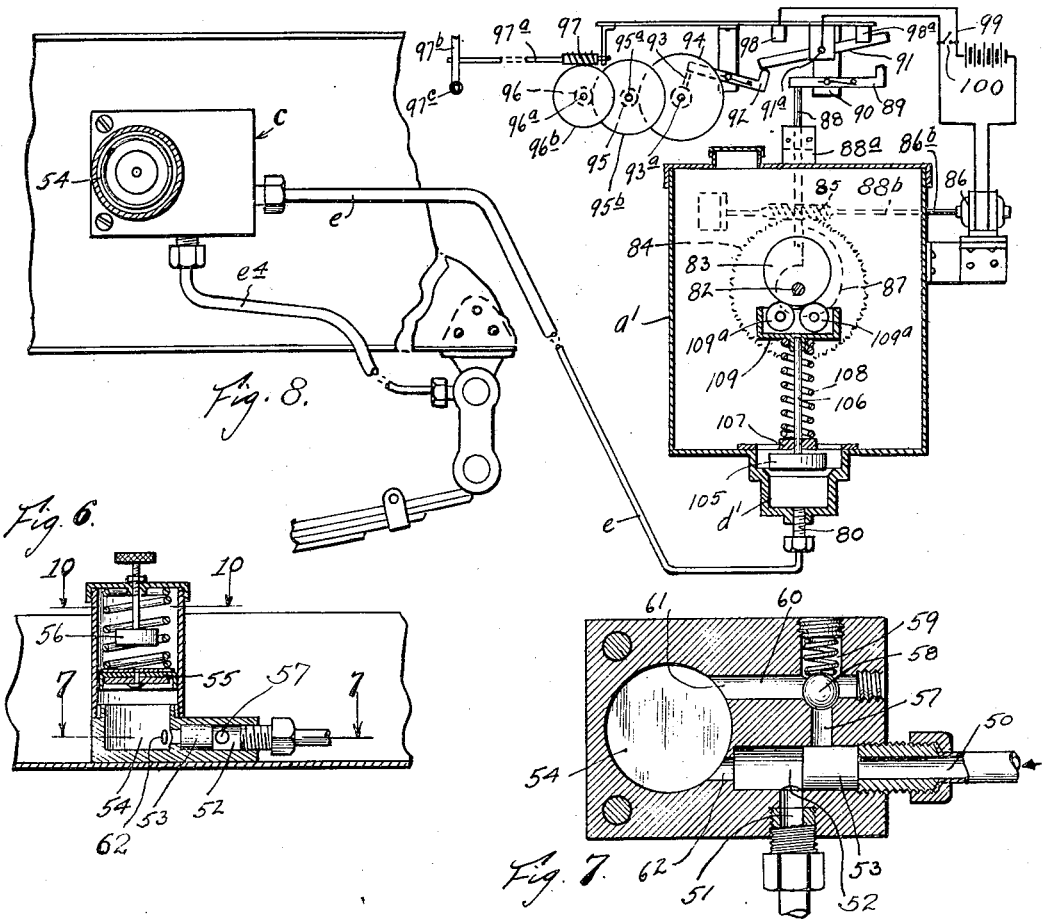

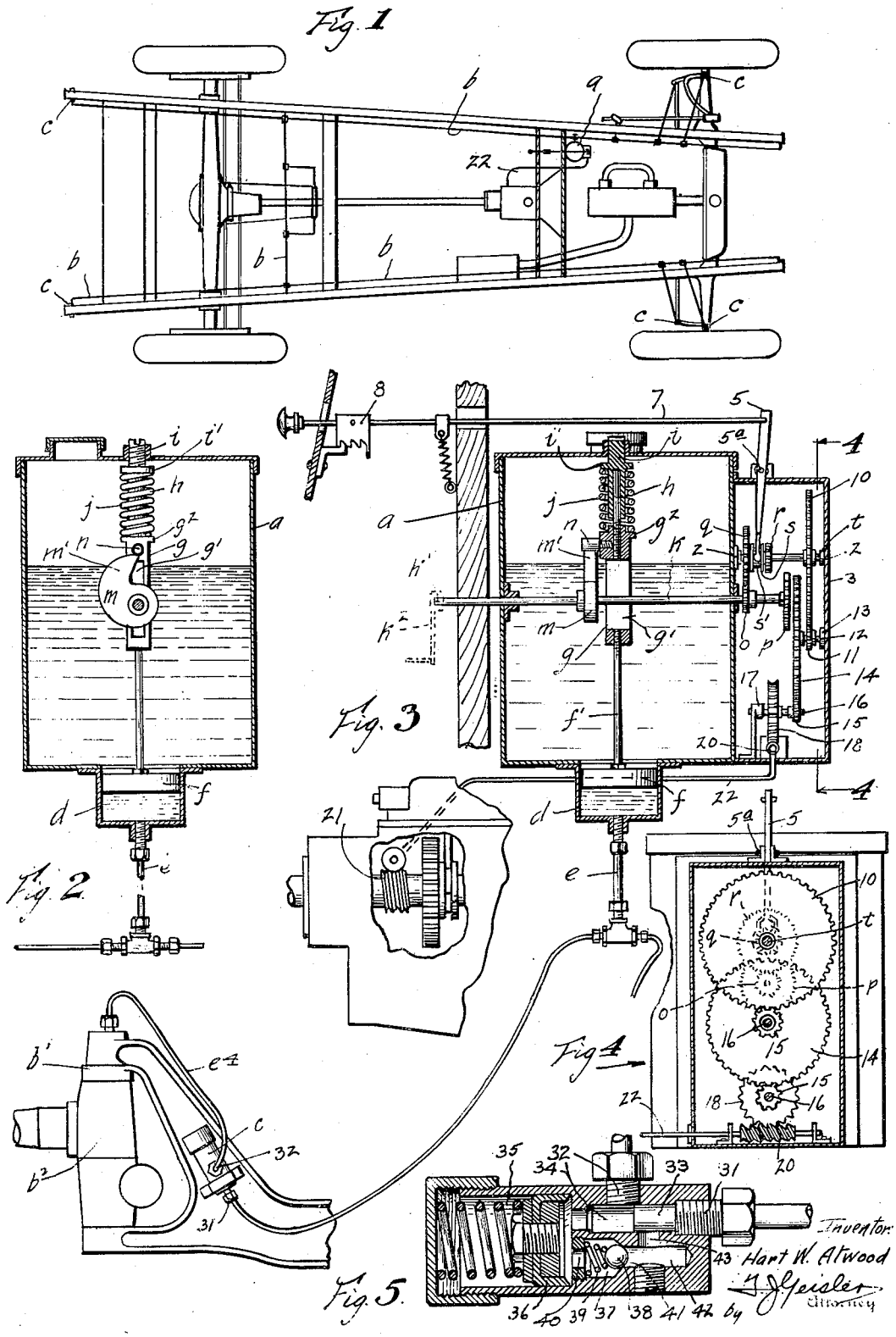

Patented May 5, 1931

1,803,456

UNITED STATES PATENT OFFICE

HART W. ATWOOD, OF PORTLAND, OREGON

AUTOMATIC MEANS FOR LUBRICATING THE BEARINGS OF A MACHINE

Application filed March 8, 1927. Serial No. 173,724.

My invention is especially adapted to be used on motor vehicles and the like.

The lubrication of the various bearings of a motor vehicle is at present attained by oil or grease cups, or such means as the so-called "Alemite system", or by a central, manually or mechanically operated lubricator which forces the lubricant to the bearings through conduits.

When the bearings are oiled individually and manually, at the discretion of the operator, it frequently happens that some of the less important bearings are neglected or overlooked, and lubricating by a system, such as the alemiting must be done while the vehicle is standing still.

Where a central lubricator is depended upon, there is a tendency for the conduits to clog or choke, and cut off the supply of oil to one or more of the bearings, and as each bearing is oiled simultaneously, the result is that those bearings of which the conduits are clogged will be compelled to operate without proper lubrication.

Furthermore, some bearings require more lubrication than others, and should be supplied with more lubricant than the other bearings which do not require so much lubricant.

Hence, lubricating from a central source from which distribution takes place to all bearings is not dependable.

With these considerations in mind, I have found that there must be an automatic lubricating agent at each bearing operating to continuously supply the bearing individually with lubricant; such agent must be supplied constantly from a common source; for example, at required intervals to maintain its supply and thereby to insure efficient lubrication of each bearing proportionally to its work.

The principal object of my invention is to provide an automatic lubrication means which will function continuously to lubricate by pressure, each bearing of a motor vehicle, through the medium of individual independent automatic lubricators located at each bearing, and such lubricators will in turn be automatically filled with lubricant at intervals from a common source of supply, so as to insure these lubricators of being capable of functioning properly without attention on the part of the operator of the vehicle.

Heretofore it has been tried to lubricate the individual bearings of a machine by means operatably connected and timed with the latter, for charging the bearings, at intervals, by pressure, with lubricant, in some instances the quantity being measured. But I do not consider such mode of lubrication efficient nor dependable.

The object of my invention is to provide a substantially constant supply of lubricant to the individual bearings of the machine, proportioned to their requirements. The lubricant shall be fed to the bearings by pressure, so as to assure its delivery to the bearings, but not so as to tend to cause any excessive, wasteful feed of lubricant.

A further object of my invention is to provide an automatic lubrication means for machinery which may be controlled from the instrument board of the motor vehicle, or other convenient place.

A further object of my invention is to provide a lubrication means by which the lubrication of each bearing may be individually adjusted or the lubrication of a particular bearing cut out entirely, without affecting the functioning of the lubrication of the other bearings.

A still further object of my invention is to provide a lubrication method and means which is simple in construction and operation, practical, economical of manufacture, and efficient in operation.

I attain my object by providing the individual bearings of the machine with individual lubricant storing and feeding chambers, and provide means—a force pump—operated by the machine, by which said individual chambers are kept filled from a common source of lubricant. And in connection with each of said individual chambers, I provide independent relatively low pressure means adapted to feed lubricant constantly to the related bearing, the latter means being adapted to be placed in their active state by the pressure in said conduit and functioning when such pressure ceases. Thus if the bearing is already amply lubricated, it may offer some resistance to receiving further lubricant from the lubricant storage chamber.

Furthermore, in order to avoid unnecessary work in the filling of the individual storage chambers from the main storage chamber, the capacities of the former may be limited to the requirements of the particular bearing; and such limitation may be made variably by providing adjustable devices to this end.

And since the force-pump must continue working, being timed with the machine whose bearings are being lubricated, it is so arranged as to accommodate any interference with its periodic action. In short, the piston of the force-pump is given a loose fit, so that, when all the individual storage chambers have been filled and further transfer of lubricant thereto is resisted, the loose fit of the piston of the force-pump will permit the lubricant to pass by and thus the piston will cease to function for the time.

These and other incidental objects and the details of construction of my invention will hereinafter be more fully described with reference to the accompanying drawings—

In which:

Fig. 1 shows a diagrammatic plan view of the chassis of a motor vehicle and my automatic lubrication means;

Fig. 2 shows a sectional rear elevation of the lubricant reservoir;

Fig. 3 shows a sectional side elevation of the lubricant reservoir and the operating mechanism therein, and illustrates in diagrammatic fragmentary portions the driving mechanism provided for my lubrication means and a lubricator connected thereto located on a steering knuckle bearing;

Fig. 4 shows a section taken on the line 4—4 of Fig. 3, looking in the direction of the arrows, and illustrates further details of the operating mechanism;

Fig. 5 shows a central longitudinal section of a lubricator and illustrates the details of construction thereof;

Fig. 6 shows another form of lubricator;

Fig. 7 shows a section taken on the line 7—7 of Fig. 6, looking in the direction of the arrows; and illustrates further details of construction of this lubricator;

Fig. 8 shows diagrammatically my lubrication means illustrated by Figs. 6 and 7, as adapted for electrical control and illustrates in a fragmental portion, my lubrication means connected to one of the bearings of a spring.

My invention comprises a lubricant reservoir $a$ located at any convenient point on the motor vehicle, as in Fig. 1, and tubular conduits $b$ leading therefrom to individual lubricators $c$ located at each bearing on the motor vehicle.

The oil reservoir $a$, Figs. 2, 3 and 4, is provided in its bottom with a cylindrical depression $d$ from which the oil conduit $e$ leads.

Within the cylindrical depression $d$ is provided a piston $f$ which is slightly smaller in diameter than the cylindrical depression, and which lubricant may normally seep past into the space below when in an upraised position as in Fig. 3.

The piston $f$ is provided with a rod $f'$, to the upper end of which is fixed an oblong block $g$ provided with a central longitudinal slot $g'$. To the upper end of the block $g$ is fixed a stem $h$, the upper end of which is slidably seated in a hollow cylindrical member $i$, fixed to the top of the reservoir and extending downwardly therefrom, and provided adjacent the top of the reservoir with a shoulder $i'$.

A compression coil spring $j$ is arranged over the member $i$ and bears against the shoulder $i'$ and a shoulder $g2$ on the block $g$.

A transverse shaft $k$ is arranged in the reservoir so as to extend through the slot $g'$ in the block $g$ and through each side of the reservoir, the said shaft being journaled therein and the end $k'$ of the shaft is adapted to be provided with a crank $k2$ for manual operation as shown by the dotted lines in Fig. 3.

A spiral cam $m$ is fixed to the shaft adjacent the block $g$, and normally bears against a pin $n$ in the block $g$.

On the other end of the shaft $k$ are fixed a small gear $o$ and a larger gear $p$, adapted to mesh with a large gear $q$ and a smaller gear $r$, respectively, and the gears $q$ and $r$ are connected by a sleeve $s$, provided with a circumferential groove $s'$ between the two gears.

The sleeves $s$ and the gears $q$ and $r$ are fastened on a shaft $t$ and adapted for longitudinal movement thereon by means of splines, not shown in the drawings. The shaft $t$ is mounted for rotation in journals 2, one fixed to the exterior of the adjacent side of the reservoir and the other to the interior of the opposite wall 3 of a housing which encloses this mechanism.

A gear shifting lever 5 is pivoted as at 5a, the lower end of which is forked and is adapted to bear in the groove $s'$ in the sleeve $s$; and a rod 7 is pivotally fastened to its upper end which leads to the instrument board of the motor vehicle and is provided with a spring controlled catch 8.

By this means either the gears $q$ and $o$ or the gears $r$ and $p$ may be brought into engagement by shifting the lever 5, from the instrument board by the rod 7, thus the speed of the mechanism may be increased or decreased, or thrown entirely out of gear, as desired.

The shaft $t$ is also provided with a large gear 10 which meshes with a smaller gear 11, mounted on a stub shaft 12 which is journaled on the housing wall 3 as at 13, and on the shaft 12 is also fixed a larger gear 14 which in turn meshes with a small gear 15 mounted on a stub shaft 16 which is journaled as at 17 and on which is also mounted a larger gear 18 which meshes with a worm gear 20, which is driven by means of a flexible shaft 22 from any convenient place on the motor vehicle, as the transmission, as at 21.

In the operation of this unit of my invention, the reservoir $a$ is filled with lubricant and the shaft $t$ is rotated slowly from the transmission or other suitable means by the reducing gears 10, 11, 14 and 15 and the cam $m$ bears against the pin $n$ and raises the rod $f'$ and the piston $f$ slowly upward, the lubricant meantime seeping past the piston into the space below, then as the pin $n$ reaches the top of the spiral $m'$ of the cam $m$, the piston will be forced quickly downward by the action of the spring $j$, and the oil which has collected beneath the piston will be forced through the tubular conduit $e$ with considerable pressure to the lubricators hereinafter described.

The tubular conduit $e$ leads with the necessary branches to each bearing, and adjacent each bearing, as shown in Figs. 1, 3 and 4 are provided lubricators.

Referring now to Figs. 5 to 7 inclusive, I show various forms of my lubricators.

The lubricator shown in Fig. 5 is provided with an inlet 31 and an outlet 32. A piston 33 is arranged in a chamber 34 into which the inlet leads and is adapted to move back and forth therein. The end of the chamber 34 is reduced in size and leads into a larger storage chamber 35 in which is provided a spring seated plunger 36 and leading from the chamber 35 through a port 40 and parallel to the chamber 34 is another chamber 37, in which is located a ball 38 seated on a spring 39, and arranged to normally close a port 41 leading to a chamber 42 in which is provided a port 43 leading to the chamber 34 the relative arrangements of the port 43 and the outlet 32 are such that the piston 33 will not open the port 43 until the outlet 32 is closed, thus to prevent the lubricant from flowing from the storage chamber 35 into the outlet, when actuated by the pressure from the port 43.

In the operation of this lubricator, a charge of lubricant is forced through the tubular conduit $e$ by the rapid stroke of the piston $f$ into the inlet 31 and the chamber 34 and the piston 33 is forced by the sudden impact of the lubricant, quickly to the opposite end of the chamber 34, closing the outlet 32 and the reduced end of the chamber 34 and opening, after closing the outlet 32, the port 43 so that the lubricant passes through to the chamber 42 and through the port 41 forcing the ball 38 back on the spring 39 which allows the lubricant to pass into the storage chamber 35 and the pressure of the lubricant on the plunger 36 forces the plunger back on its spring.

When the pressure in the conduit $e$ is released, the ball 38 forced by the spring 39 closes the port 41, thus preventing a back-flow of lubricant to the source, and the lubricant due to the pressure of the spring seated plunger 36, returns the piston 33 to its first position in the chamber 34, which closes the port 41 and the lubricant then passes through the outlet 32 to the bearing, as for instance, the bearing $b'$ of a steering knuckle $b2$ through a conduit $e4$ as shown in Fig. 3.

Referring now to Figs. 6 and 7, I show another of my lubricators of somewhat different form, provided with an inlet 50 and outlet 51, the inlet leading into a cylindrical chamber 52 in which is located a piston 53, as in the previously described lubricator. The chamber 52 leads through a port 62 into a large cylindrical chamber 54 arranged vertically to the former and in which is located a spring seated plunger 55. A stop 56 is arranged above the plunger 55 to provide adjustment for this lubricator, by limiting the amount which may be contained in the said chamber.

Leading from the chamber 54 through a port 61 is provided a chamber 60 parallel to the chamber 52 and provided with a port 57 leading thereto, a spring seated ball 58 is provided which is normally seated in the port 57, but adapted to be received in a recess 59.

In the operation of this lubricator, a charge of lubricant, as previously described, enters through the inlet 50 and forces the piston valve 53 to the end of the chamber 52, Fig. 6, which closes the outlet 51, and the lubricant passes through the port 57 and unseats the ball check-valve 58, and then passes through the outlet 61 of the chamber 60 into the chamber 54 and the plunger 55 is forced upward against the tension of its spring as far as the adjustable stop 56 will allow. The piston valve 53 is held against and closes the port 62 until the pressure in the conduit $e$ is released, then the spring seated ball valve 58 closes the port 57 and prevents the back-flow of lubricant to the source and the plunger 55, actuated by its spring, forces the lubricant against the piston valve 53, which resumes its first position, Fig. 7, and closes the port 57 and the inlet 50, and the lubricant is forced out through the outlet 51 to the bearing, as shown in Fig. 3.

In Fig. 8, I provide the operating mechanism of an oil reservoir adapted to be driven by electrical means.

Referring to Fig. 8, the oil reservoir $a'$ is similar in its essential features to the reservoir $a$ shown in Figs. 2, 3 and 4.

Centrally located in the reservoir $a'$ is a transverse shaft 82 provided with a circular eccentric cam 83 and on the end of the shaft which extends through the walls of the reservoir are mounted an enlarged gear 84 which meshes with the worm gear 85 driven by an electric motor 86, and a spiral cam 87 upon which one end of a vertically arranged rod 88 rests. The rod 88 is slidably supported as at 88a and the upper end of the said rod bears upwardly against a spring-controlled lever 89 supported as at 90.

Above the lever 89 is located another lever 91 pivoted as at 91a adapted to normally rest on the upturned end of an adjacent horizontal spring controlled lever 92 the other end of which is arranged to engage an arm 93 which is fixed to a shaft 93a, on which is also fixed a gear 94 which meshes with a small gear 95 fixed on a shaft 95a on which is also fixed a large gear 95b which meshes with a small gear 96 fixed on a shaft 96a on which is also fixed a large gear 96b, which meshes with a worm gear 97, mounted on a shaft 97a, upon which a spiral gear 97b is also mounted that meshes with a worm gear 97c driven from the engine in any convenient manner.

Above the lever 91 is provided an electrical contact point 98 to which one end of the circuit 99 of the electric motor 86 is connected and the other end of the circuit is connected to the lever 91 as at 91a. A stop 98a is provided above the end of the lever 91 and by this construction, the circuit 99 is closed when the lever 91 is in one position and open when in the other.

A manually operated switch 100 is provided in the circuit 99 for the independent control of the motor from the instrument board.

A piston 105 is loosely arranged in the cylindrical depression d' in the reservoir a' from which the outlet 80 to the conduit e leads, similarly to that shown in Fig. 3, and the piston rod 106 extends upwardly through a guide 107 and a compression coil spring 108 is mounted over the rod and bears against the guide 107 and against a head 109 provided with upturned sides which head is fixed to the upper end of the rod 106, and in which parallel rollers 109a are mounted and against which the eccentric cam 83 bears as it rotates and forces the piston downward into the depression d', the piston rising again by the action of the spring 108.

In the operation of the mechanism last described, the reducing gears 94, 95b, 96b and the arm 93 will be rotated slowly by the worm 97c and raise the lever 92 once each revolution of the shaft 93a, which will raise the lever 92 and close the electric circuit 99, which will actuate the motor 86 and the eccentric cam 83 will be rotated once by means of the worm gear 85 on the shaft 86b of the motor and the gear 84, and the rod 88 will move downward by the action of the spiral cam 87, and allow the spring controlled lever 89 to move upward and break the contact at 98; thus the piston will be forced downward, driving a charge of oil through the outlet 80 into the conduit e, and the piston will then rise to its former position by the action of the spring 108.

I claim:—

1. In lubricating means for machine bearings, a source of lubricant, means for placing said source under pressure, and an individual lubricator at each bearing connected by a conduit with said source, said lubricator comprising a storage chamber provided with inlet and outlet passageways, the former connected with said conduit, a valve-chamber included in said inlet passageway and provided with inlet and outlet ports, the inlet port being located nearest the entrance of said passageway, and having a separate inlet duct extending therefrom into said storage-chamber, said outlet port being connected with said outlet passageway, a piston-valve reciprocal in said valve-chamber, adapted in one position to close said inlet port and in its other position to close said outlet port and open said inlet port, a supplemental valve-chamber included in said separate inlet-duct, and a check valve in such supplemental valve-chamber, whereby the pressure of the lubricant, from said source, and the pressure in said storage-chamber will tend, respectively, to position said piston-valve relative to said ports of said valve chamber.

2. In lubricating means for machine bearings, a source of lubricant, means for placing said source under pressure, and an individual lubricator at each bearing connected by a conduit with said source, said lubricator comprising a storage chamber provided with inlet and outlet passageways, the former connected with said conduit, a valve-chamber included in said inlet passageway and provided with inlet and outlet ports, the inlet port being located nearest the entrance of said passageway, and having a separate inlet duct extending therefrom into said storage chamber, said outlet port being connected with said outlet passageway, a piston-valve reciprocal in said valve-chamber, adapted in one position to close said inlet port and in its other position to close said outlet port and open said inlet port, a supplemental valve-chamber included in said separate inlet-duct, and a check valve in such supplemental valve chamber, means for creating a yielding pressure in said storage chamber, whereby the pressure of the lubricant from said source, and the pressure in said storage-chamber will tend, respectively, to position said piston-valve relative to said ports of said valve-chamber.

3. In lubricating means for machine bearings, a source of lubricant, means for placing said source under pressure, and an individual lubricator at each bearing connected by a conduit with said source, said lubricator comprising a storage chamber provided with inlet and outlet passageways, the former connected with said conduit, a valve-chamber included in said inlet passageway and provided with inlet and outlet ports, the inlet port being located nearest the entrance of said passageway, and having a separate inlet duct extending therefrom into said storage chamber, said outlet port being connected with said outlet passageway, a piston-valve reciprocal in said valve-chamber, adapted in one position to close said inlet port and in its other position to close said outlet port and open said inlet port, a supplemental valve-chamber included in said separate inlet-duct, and a check valve in such supplemental valve-chamber, a spring controlled plunger in said storage chamber, whereby the pressure of the lubricant, from said source, and the pressure in said storage chamber will tend, respectively, to position said piston-valve relative to said ports of said valve-chamber.

4. In lubricating means for machine bearings, a source of lubricant, means for placing said source under pressure, and an individual lubricator at each bearing connected by a conduit with said source, said lubricator comprising a storage chamber provided with inlet and outlet passageways, the former connected wth said conduit, a valve-chamber included in said inlet passageway and provided with inlet and outlet ports, the inlet port being located nearest the entrance of said passageway, and having a separate inlet duct extending therefrom into said storage chamber, said outlet port being connected with said outlet passageway, a piston-valve reciprocal in said valve-chamber, adapted in one position to close said inlet port and in its other position to close said outlet port and open said inlet port, a supplemental valve-chamber included in said separate inlet-duct, and a check valve in such supplemental valve-chamber, a spring controlled plunger in said storage chamber means for limiting the movement of said plunger, whereby the pressure of the lubricant from said source, and the pressure in said storage chamber will tend, respectively, to position said piston-valve relative to said ports of said valve-chamber.

HART W. ATWOOD.